United States Patent
Surnilla et al.

(10) Patent No.: US 9,523,303 B2
(45) Date of Patent: Dec. 20, 2016

(54) SYSTEM AND METHOD FOR REGENERATING A PARTICULATE FILTER

(71) Applicant: Ford Global Technologies, LLC, Dearborn, MI (US)

(72) Inventors: Gopichandra Surnilla, West Bloomfield, MI (US); Manish Sharma, Inkster, MI (US); James Robert Warner, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/608,829

(22) Filed: Jan. 29, 2015

(65) Prior Publication Data
US 2016/0222857 A1 Aug. 4, 2016

(51) Int. Cl.
| | | |
|---|---|---|
| F01N 9/00 | (2006.01) | |
| B01D 35/00 | (2006.01) | |
| F01N 3/00 | (2006.01) | |
| F02P 5/145 | (2006.01) | |

(52) U.S. Cl.
CPC .............. *F01N 9/002* (2013.01); *B01D 35/005* (2013.01); *F01N 3/005* (2013.01); *F02P 5/145* (2013.01)

(58) Field of Classification Search
CPC ................ F01N 2560/025; F01N 2560/028; F01N 2900/1628
See application file for complete search history.

(56) References Cited

U.S. PATENT DOCUMENTS

| | | |
|---|---|---|
| 6,988,361 B2 | 1/2006 | van Nieuwstadt et al. |
| 8,745,971 B2 | 6/2014 | Yezerets et al. |
| 8,752,534 B2 | 6/2014 | Soltis |
| 2003/0172646 A1* | 9/2003 | Hiratsuka ............... F01N 3/005 60/285 |
| 2010/0101409 A1* | 4/2010 | Bromberg ............... F01N 3/025 95/8 |
| 2010/0115919 A1* | 5/2010 | Yoda .................. B01D 53/9431 60/276 |
| 2010/0236532 A1* | 9/2010 | Xiao ..................... F02D 41/146 123/677 |
| 2012/0158242 A1* | 6/2012 | Snopko ................... F01N 9/002 701/36 |
| 2012/0216507 A1 | 8/2012 | Nieuwstadt |
| 2014/0156172 A1 | 6/2014 | Surnilla et al. |
| 2015/0047339 A1 | 2/2015 | Rollinger et al. |
| 2015/0047603 A1 | 2/2015 | Surnilla et al. |

OTHER PUBLICATIONS

Maunula, T. et al., "Catalyzed Particulate Filters for Mobile Diesel Applications," SAE Technical Paper Series No. 2007-01-0041, Fuels and Emissions Conference Cape Town, South Africa, Jan. 23-25, 2007, 10 pages.

(Continued)

*Primary Examiner* — Jonathan Matthias
(74) *Attorney, Agent, or Firm* — Julia Voutyras; Alleman Hall McCoy Russell & Tuttle LLP

(57) ABSTRACT

Methods and systems are provided for determining soot stored in a particulate filter and regenerating the particulate filter. In one example, a method provides for operating oxygen sensors in a way that allows water in exhaust gases to be determined. The water in exhaust gases may be a basis for determining an amount of soot stored in a particulate filter.

18 Claims, 5 Drawing Sheets

(56) References Cited

OTHER PUBLICATIONS

Sharma, M. et al., "Modeling Water Condensation in Exhaust A/T Devices," SAE Technical Paper Series No. 2010-01-0885, Ford Motor Co. Apr. 10, 2010, 9 pages.
Surnilla, G. et al "Method and System for Secondary Fluid Injection Control in an Engine," U.S. Appl. No. 14/539,716, filed Nov. 12, 2014, 56 pages.

* cited by examiner

SYSTEM AND METHOD FOR REGENERATING A PARTICULATE FILTER

FIELD

The present description relates generally to methods and systems for controlling a vehicle engine to oxidize particulate matter from a particulate filter in an exhaust system.

BACKGROUND/SUMMARY

Particulate filters may be utilized in vehicle exhaust systems to trap carbonaceous soot that may be exhausted from an internal combustion engine. Once particulate matter is stored in the particulate filter, it may be oxidized and released from the particulate filter as carbon dioxide. The oxidation proceed may reduce vehicle fuel efficiency. Therefore, it may be desirable to only oxidize or regenerate the particulate filter when a desired amount of particulate matter has accumulated within the particulate filter. One way to estimate an amount of particulate matter stored within a particulate filter is based on a pressure change across the particulate filter. However, pressure sensors add cost to an exhaust system and may become plugged with soot. Another way to estimate soot trapped in a particulate filer is to estimate soot output of an engine via a model and use the model output as an estimate of soot stored in the particulate filter. Nevertheless, modeling errors and varying operating conditions may result in particulate matter estimates that invoke filter regeneration more or less frequent than is desired. Thus, it may be desirable to estimate an amount of soot stored in a particulate filter in a way that may be more cost effective than using pressure sensors and more accurate than an engine particulate matter model.

The inventors herein have recognized the above-mentioned issues and have developed a method for regenerating a particulate filter, comprising: estimating an amount of water stored within the particulate filter; and regenerating the particulate filter in response to the amount of water stored.

By regenerating a particulate filter in response to an amount of water stored in the particulate filter, it may be possible to provide the technical result of regenerating a particulate filter without the added cost of pressure sensors and at conditions when particulate filter regeneration is desired. In one example, output of existing upstream and downstream oxygen sensors is a basis for determining an amount of water stored within a particulate filter during an engine cold start. The amount of water stored within the particulate filter may be correlated to an amount of soot held within the particulate filter because the soot tends to increase the amount of water a particulate filter may store. In this way, an estimate of water stored in a particulate filter may be a basis for determining an amount of soot stored in the particulate filter and initiating particulate filter regeneration.

The present description may provide several advantages. Specifically, the approach may provide timely particulate filter regeneration without the added expense of exhaust pressure sensors. Further, the approach may initiate particulate filter regeneration using existing sensors so that additional sensor diagnostics are not required. Further still, the approach may provide a more accurate estimate of an amount of soot stored within a particulate filter than other estimation methods.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
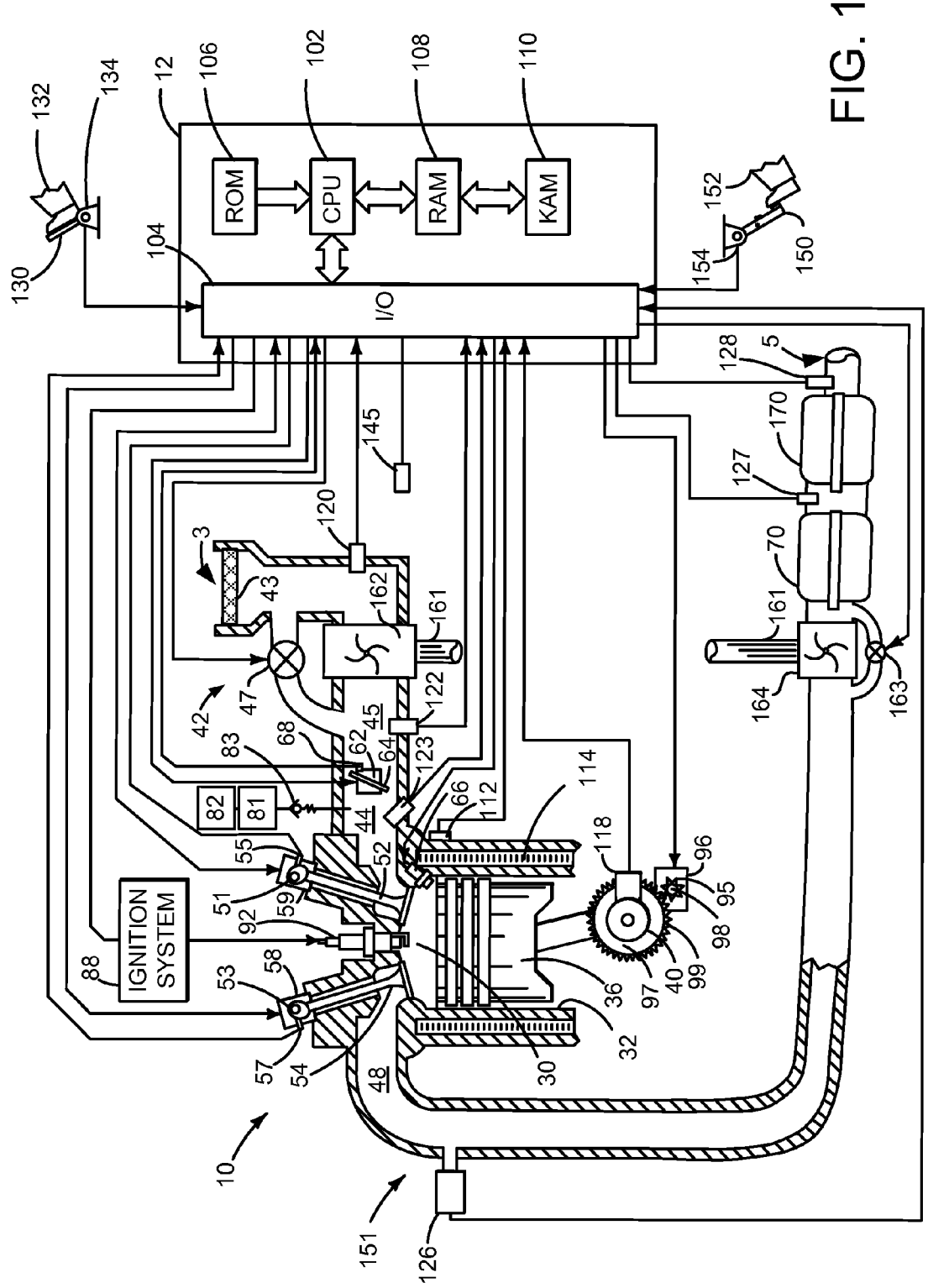
FIG. 1 shows a schematic depiction of an engine.
Figure 4:
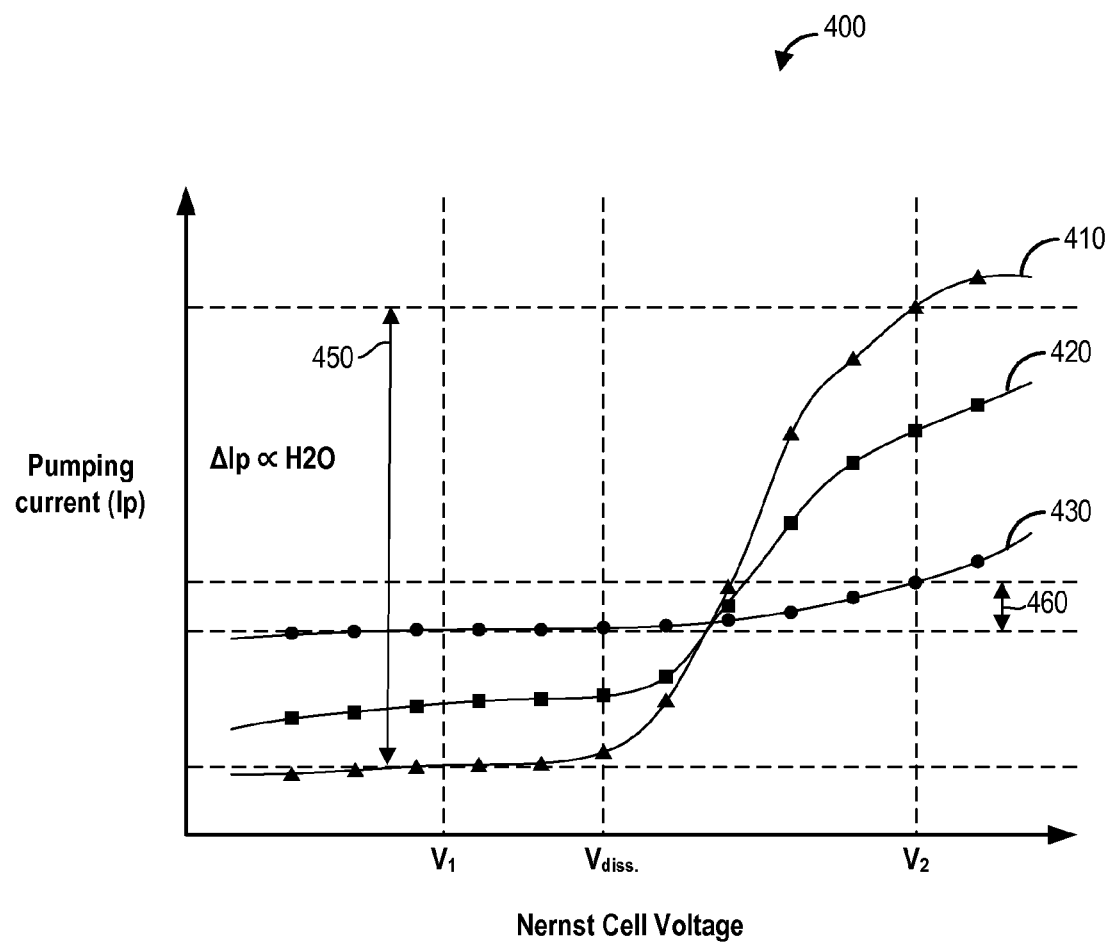
FIG. 4 shows oxygen sensor characteristics desirable for determining water in exhaust gases.
Figure 5:
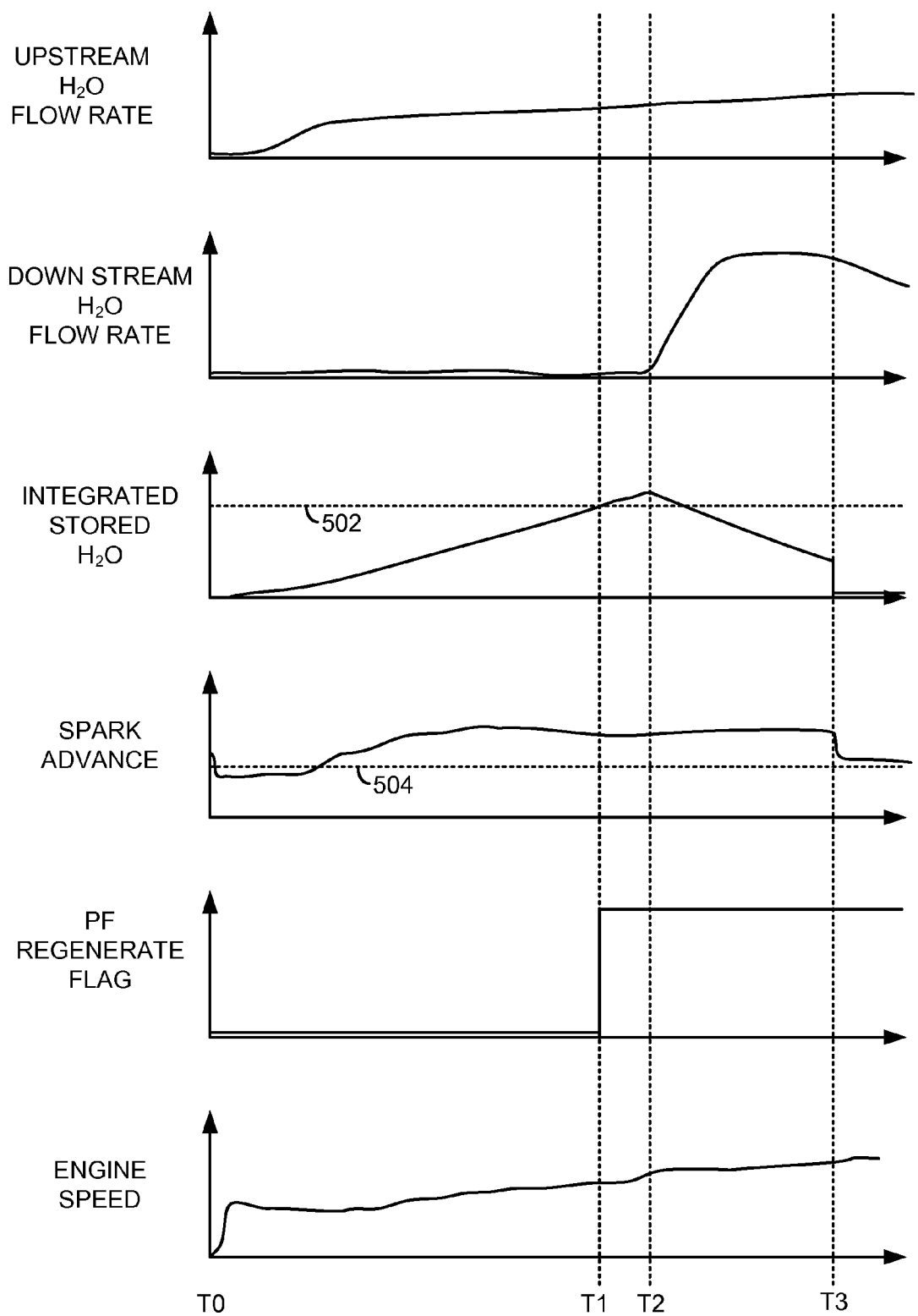
FIG. 5 shows a simulated sequence according to the method of FIGS. 2 and 3.

The present description is related to regenerating a particulate filter in an exhaust system of a vehicle that includes an engine. The engine may be configured as is shown in FIG. 1. The engine of FIG. 1 may be operated according to the method of FIGS. 2 and 3 to regenerate a particulate filter. The method of FIGS. 1 and 2 may leverage the operating characteristics of oxygen sensors shown in FIG. 4 to determine when it may be desirable to regenerate a particulate filter in response to an amount of water the particulate filter stores during an engine cold start. Finally, FIG. 5 shows an example sequence of the system of FIG. 1 operating according to the method of FIGS. 2 and 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5 which is exposed to ambient temperature and pressure. Thus, piston 36 and combustion chamber 30 may operate as a pump when engine 10 rotates. Inlet 3 is upstream of outlet 5 according to a direction of flow through engine 10, exhaust manifold 48, and engine air intake 42. Upstream does not include anything outside the engine past the inlet, and downstream does not include anything outside the engine past the outlet.

Distributorless ignition system 88 provides an ignition spark to combustion chamber 30 via spark plug 92 in response to controller 12. Universal Exhaust Gas Oxygen (UEGO) sensor 126 is shown in exhaust system 151 coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Converter 70 is positioned upstream of particulate filter 170. Universal (linear) oxygen sensor 127 is positioned upstream of particulate filter 170, and universal oxygen sensor 128 is positioned downstream of particulate filter 170.

Engine 10 may provide vacuum to vacuum reservoir 81 via check valve 83. Air flows from vacuum reservoir 81 into intake manifold 44 when pressure in intake manifold is less than pressure in vacuum reservoir 81. Vacuum reservoir 81 provides vacuum to vacuum consumers 82. Vacuum consumers may include but are not limited to brake boosters, waste gate actuators, and air conditioning duct actuators.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of humidity from humidity sensor 145 for determining exhaust dewpoint temperature; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a vehicle system, comprising: an engine; an exhaust system coupled to the engine, the exhaust system including a particulate filter, a first oxygen sensor, and a second oxygen sensor; and a controller including instructions stored in a non-transitory memory for estimating an amount of water stored in the particulate filter responsive to outputs of the first and second oxygen sensors. The vehicle system includes where the first oxygen sensor is upstream of the particulate filter in a direction of exhaust flow, and where the second oxygen sensor is downstream of the particulate filter. The vehicle system includes where the controller includes further instructions to adjust a Nernst cell voltage of the first and second oxygen sensors.

In some examples, the vehicle system includes where amount of water stored in the particulate filter is based on a difference in pumping current of the first oxygen sensor and a difference in pumping current of the second oxygen sensor. The vehicle system includes where the controller includes further instructions to estimate the amount of water stored in the particulate filter based on an amount of water entering the particulate filter before a temperature of the particulate filter is greater than a dewpoint temperature in the particulate filter. The vehicle system further comprises additional instructions to regenerate the particulate filter in response to the amount of water stored in the particulate filter being greater than a threshold amount. The vehicle system includes where the threshold amount corresponds to a threshold amount of soot stored within the particulate filter. The vehicle system includes where the additional instructions to regenerate the particulate filter include instructions to retard spark timing to increase exhaust gas temperature.

Figure 2:
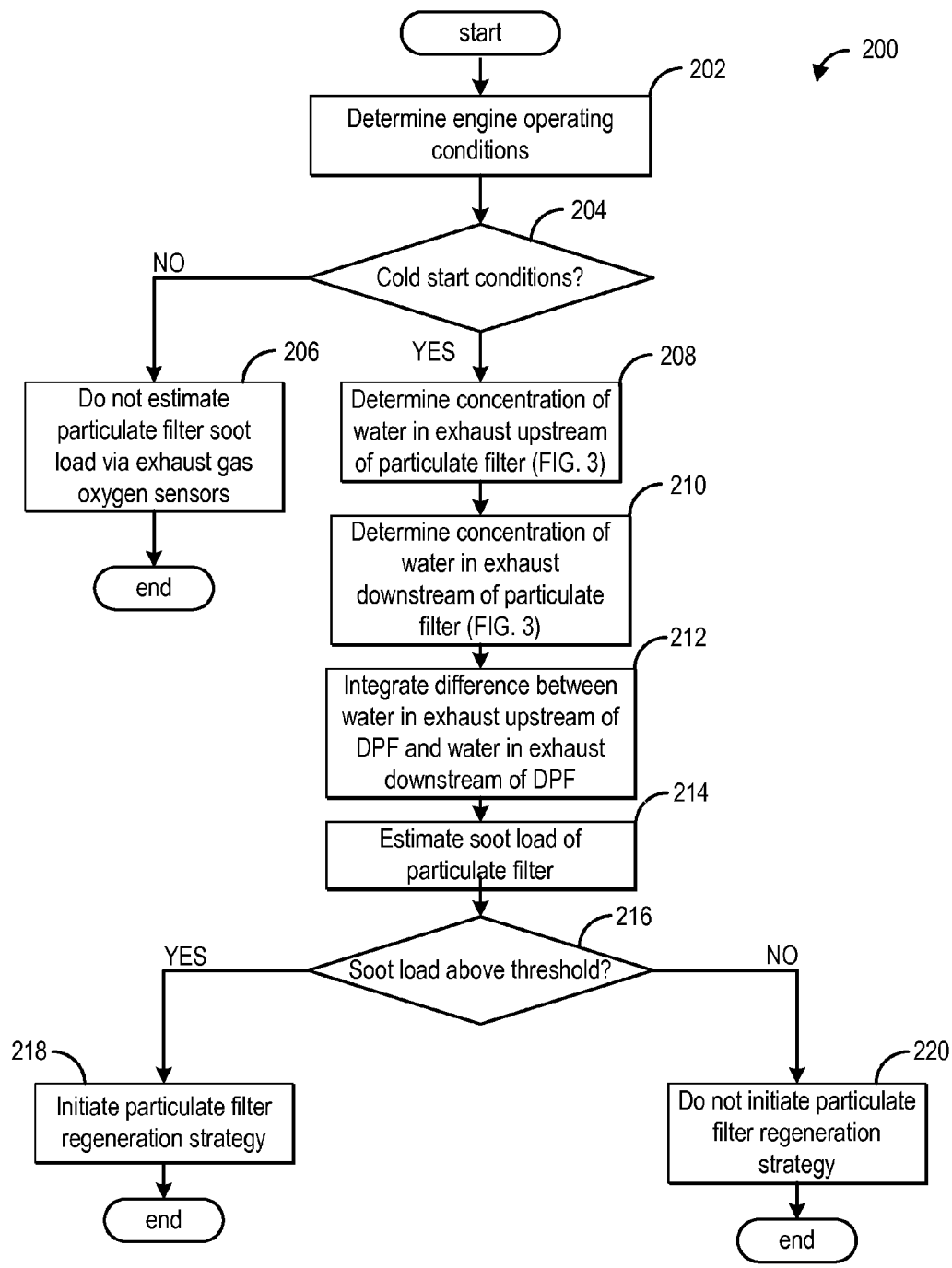
FIGS. 2 and 3 show a flowchart of an example method for regenerating a particulate filter.
Figure 3:
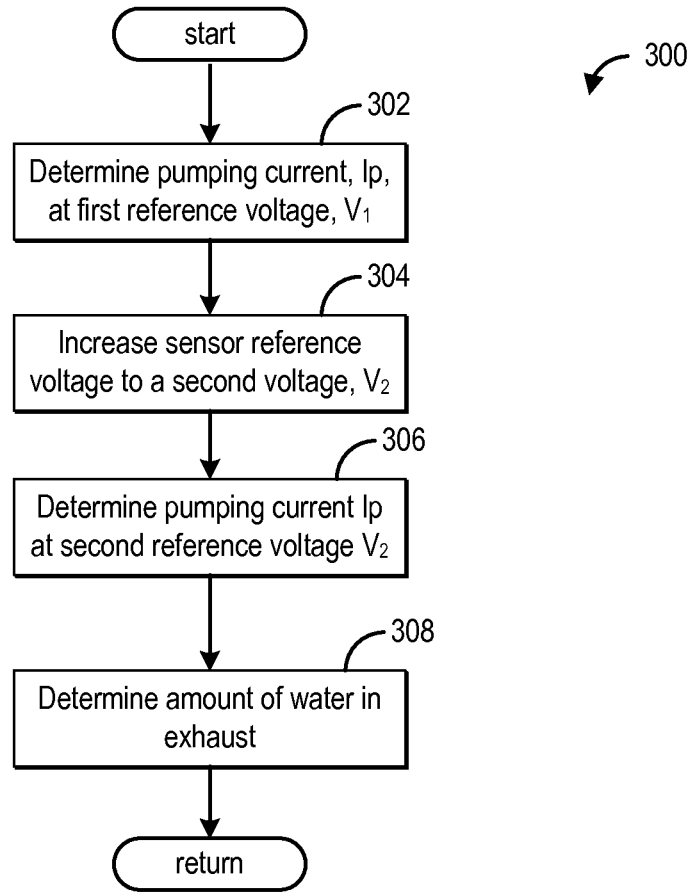

Referring now to FIGS. 2 and 3, a method for operating an engine is shown. The method of FIGS. 2 and 3 may be incorporated into the system of FIG. 1 as executable instructions stored in non-transitory memory. Further, the method of FIGS. 2 and 3 may provide the operating sequence as is shown in FIG. 4.

At 202, method 200 determines engine operating conditions. Engine operating conditions may include but are not limited to time since engine start, engine coolant temperature, exhaust dewpoint temperature, ambient air temperature, engine speed, and engine load. The engine operating conditions may be determined via data from engine sensors described in FIG. 1 and from transfer functions for converting sensor output to variable values. Method 200 proceeds to 204 after engine operating conditions are determined.

At 204, method 200 judges if engine cold start conditions are present. Engine cold start conditions are present after an engine start when engine temperature is less than a first threshold temperature and before predetermined conditions. The predetermined conditions may include but are not limited to engine exhaust temperature being greater than a dewpoint temperature in the exhaust system or in the particulate filter and/or engine temperature less than a second thresh temperature, the second threshold temperature greater than the first threshold temperature. The engine cold start may also be exited in response to time since engine stop being greater than a threshold time. If method 200 judges that engine cold start conditions are present, the answer is yes and method 200 proceeds to 208. Otherwise, the answer is not and method 200 proceeds to 206.

At 206, method 200 ceases to determine an amount of water stored in a particulate filter of the engine exhaust system if the engine was previously cold started. Further, method 200 may exit the engine cold start mode if the engine was operating in a cold start mode. Additionally, the amount of soot and water estimated to be stored within the particulate filter may be adjusted to zero or stored to memory for cold start to cold start comparisons. The engine may be operated in response to driver demand torque and engine speed after exiting cold start mode.

At 208, method 200 begins or continues to determine a concentration of water in exhaust gases upstream of the particulate filter. Method 200 determines the concentration of water in exhaust gases as described in the method of FIG. 3. Method 200 proceeds to 210 after the determination of water concentration in exhaust gases has started.

At 210, method 200 begins or continues to determine a concentration of water in exhaust gases downstream of the particulate filter. Method 200 determines the concentration of water in exhaust gases as described in the method of FIG. 3. Method 200 proceeds to 212 after the determination of water concentration in exhaust gases has started.

At 212, method 200 integrates a difference between water in exhaust gases upstream of the particulate filter and water in exhaust gases downstream of the particulate filter to determine an amount of water stored in the particulate filter. In one example, while in cold engine start conditions, the concentration of water in exhaust gases determined at 208 is multiplied by an engine air flow rate as determined by a mass air flow sensor or manifold absolute pressure sensor to determine a flow rate of water into the particulate filter each time the upstream oxygen sensor is sampled for exhaust gas water data. Further, the concentration of water in exhaust gases determined at 210 is multiplied by an engine air flow rate as determined by a mass air flow sensor or manifold absolute pressure sensor to determine a flow rate of water out of the particulate filter each time the downstream oxygen sensor is sampled for exhaust gas water data. The flow rate of water out of the particulate filter is subtracted from the flow rate of water into the particulate filter each time the oxygen sensors are sampled for exhaust gas water data and the results over the engine cold start interval are integrated. The integration result is an amount of water stored in the particulate filter, and the integration continues while the engine is operating in cold start mode.

In this way, a plurality of water concentration estimates upstream and downstream of a particulate filter are determined over an engine cold start interval from a time the engine is cranked via a starter until exhaust gas temperature exceeds a dewpoint temperature in the exhaust system or particulate filter. The water concentrations are converted into water flow rates into and out of the particulate filter, and the difference between the water flow entering the particulate filter and the water flow exiting the particulate filter is integrated to determine an amount of water stored in the particulate filter. Method 200 proceeds to 214 after the amount of water stored in the particulate filter is updated each time the oxygen sensors are sampled to determine water concentration in exhaust gases.

At 214, method 200 estimates an amount of soot stored within the particulate filter based on an amount of water stored in the particulate filter during the engine cold start. In one example, empirically determined amounts of soot (e.g., soot mass values) are stored in tables or functions that are indexed using or via the amount of water stored in the particulate filter as determined at 212. Each time the amount of water stored in the particulate filter is updated during the cold engine start, the amount of soot stored in the particulate filter is updated based on the amount of water stored in the particulate filter. In this way, the empirically determined values stored in the tables and/or functions are correlated to the amount of water stored in the particulate filter. Method 200 proceeds to 216 after the amount of particulate matter stored in the particulate filter is updated during the cold engine start.

At 216, method 200 judges if the amount of soot stored in the particulate filter is greater than a threshold amount. In one example, the threshold amount may be empirically determined and stored in memory. The threshold amount may be an amount that increases the exhaust flow restriction to greater than a threshold amount of resistance. If method 200 judges that the amount of soot stored in the particulate filter is greater than a threshold amount, the answer is yes and method 200 proceeds to 218. Otherwise, the answer is no and method 200 proceeds to 220.

At 218, method 200 sets a value of a variable in memory to indicate particulate filter regeneration is to begin as soon as vehicle operating conditions allow. In one example, the particulate filter may begin to be regenerated when engine temperature exceeds a threshold temperature. Further, other conditions may be required before particulate filter regeneration commences. For example, vehicle speed may have to be greater than a threshold speed and engine airflow may have to be greater than a threshold airflow.

In one example, engine spark timing is retarded and one or more engine cylinders are operated with a lean air-fuel mixture to regenerate the particulate filter. The retarded spark timing increases the particulate filter temperature while the lean air-fuel mixture increases oxygen in engine exhaust gases so that particulate matter stored in the particulate filter may be oxidized. The engine may operate with retarded spark timing and a lean air-fuel ratio in one or more cylinders for an amount of time based on the mass of soot stored in the particulate filter. Method 200 proceeds to exit after the particulate filter is regenerated.

At 220, method 200 does not initiate particulate filter regeneration. Since the amount of soot stored in the particulate filter is less than a threshold amount, particulate filter regeneration does not commence. The amount of water and soot stored within the particulate filter continues to be estimated while the engine is operated in cold start conditions. Method 200 exits after the water and soot estimated to be stored in the particulate filter is updated.

Referring now to FIG. 3, a method for determining a concentration of water in exhaust gases is described. The method of FIG. 3 may operate with or as part of the method of FIG. 2 in the system of FIG. 1. The engine may be operated at a constant air-fuel ratio while the method of FIG. 3 is executed.

At 302, method 300 supplies a first reference voltage to an oxygen sensor in the vehicle's exhaust system. The oxygen sensor may be located upstream or downstream of a particulate filter. The first reference is a lower reference voltage and the reference voltage is applied to a Nernst cell of the oxygen sensor. The first reference voltage may be less than 700 mV. The oxygen sensor's pumping current is determined after the first reference voltage is applied to the Nernst cell. In one example, the oxygen sensor's pumping current is sensed via a resistor and converted into a voltage that is interpreted as the oxygen sensor's pumping current.

Thus, a first reference voltage, $V_1$, may have a value such that oxygen is pumped from the cell of the oxygen sensor, but low enough that oxygen compounds such as water are not dissociated at the sensor. Application of the first reference voltage $V_1$ may generate an output of the oxygen sensor in the form of a first pumping current, $Ip_1$, that is indicative of the amount of oxygen in the sample exhaust gas. Method 300 proceeds to 304 after the oxygen sensor's pumping current is determined when the first reference voltage is applied to the oxygen sensor's Nernst cell.

At 304, method 300 increases the reference voltage applied to the oxygen sensor's Nernst cell. In one example, a digital to analog converter increases voltage supplied to the Nernst cell. The reference voltage is increased to a second reference voltage level. In one example, the second reference voltage level is greater than 1000 mV. Method 300 proceeds to 306 after the reference voltage is increased.

At 306, method 300 supplies the second reference voltage to the oxygen sensor in the vehicle's exhaust system. The second reference is a greater than the first reference voltage and the second reference voltage is applied to a Nernst cell of the oxygen sensor. The oxygen sensor's pumping current is determined after the second reference voltage is applied to the Nernst cell. In one example, the oxygen sensor's pumping current is sensed via a resistor and converted into a voltage that is interpreted as the oxygen sensor's pumping current.

Thus, a second voltage $V_2$ may have a value high enough to dissociate a desired oxygen compound. For example, the second voltage $V_2$ may be high enough to dissociate water molecules into hydrogen and oxygen. Application of the second voltage $V_2$ may generate a second pumping current, $Ip_2$, that is indicative of the amount of oxygen and water in the sample gas. It will be understood that the term "water" in the "amount of oxygen and water" as used herein refers to the amount of oxygen from the dissociated water molecules in the sample gas. Method 300 proceeds to 308 after the oxygen sensor's pumping current is determined when the second reference voltage is applied to the oxygen sensor's Nernst cell.

At 308, method 300 determines a water concentration in exhaust gases passing by the oxygen sensor. In particular, the first pumping current determined at 302 is subtracted from the second pumping current determined at 306. The change in oxygen concentration is indicative or a concentration of water in the exhaust gases. In one example, empirically determined water concentrations in exhaust gas are input to tables and/or functions that are indexed by the change in oxygen sensor pumping current. The tables and/or functions output the concentration of water in exhaust gases. Method 300 proceeds to exit or return back to the method of FIG. 2.

Method 300 may be executed a plurality of times during a cold start such than reference voltages of upstream and downstream oxygen sensors are modulated between the first and second reference voltages to determine pumping current of upstream and downstream oxygen sensors. In this way, the water concentration flowing into and out of the particulate filter may be revised during cold engine starting conditions.

Thus, the method of FIGS. 2 and 3 provides for a method for regenerating a particulate filter, comprising: estimating an amount of water stored within the particulate filter; and regenerating the particulate filter in response to the amount of water stored. The method includes where the estimated amount of the amount of water stored within the particulate filter is based on an amount of water stored within the particulate filter after a cold engine start and before a dewpoint temperature in the particulate filter is exceeded. By ceasing to estimate water stored in the particulate filter after the dewpoint temperature in the particulate filter is exceeded, water that was once stored in the particulate filter may not be subtracted from the amount of water stored in the particulate filter. The method includes where the estimate of the amount of water stored within the particulate filter is based on output of two oxygen sensors.

In some examples, the method includes where a first of the two oxygen sensors is located upstream of the particulate filter and where a second of the two oxygen sensors is located downstream of the particulate filter. The method includes where the particulate filter is regenerated via increasing a temperature of the particulate filter over a threshold temperature and supplying lean engine exhaust gas to the particulate filter. The method includes where regenerating the particulate filter includes oxidizing particulate matter stored within the particulate filter. The method further comprises estimating an amount of particulate matter stored in the particulate filter responsive to the estimate of the amount of water stored within the particulate filter.

The method of FIGS. 2 and 3 also provides for a method for regenerating a particulate filter, comprising: regenerating the particulate filter in response to integration of a difference in an amount of water entering the particulate filter and an amount of water exiting the particulate filter. The method includes where the amount of water entering the particulate filter is based on water entering the particulate filter after an engine start and before a dewpoint temperature is reached in the particulate filter. The method includes where the particulate filter is regenerated in response to a value of the integration exceeding a threshold value. The method includes where the amount of water entering the particulate filter is based on output of an oxygen sensor upstream of the particulate filter.

Referring now to FIG. 4, a plot of oxygen sensor pumping current (Ip) versus Nernst cell voltage is shown. The oxygen sensor response shown in FIG. 4 is indicative of oxygen sensors 127 and 128 shown in FIG. 1.

The vertical axis represents oxygen sensor pumping current in mA and pumping current increases in the directly of the vertical axis arrow. The horizontal axis represents Nernst cell voltage and Nernst cell voltage increases in the direction of the horizontal axis arrow.

Curve 410 represents oxygen sensor response to exhaust gases containing 10% $H_2O$ by mass. Curve 420 represents oxygen sensor response to exhaust gases containing 6.3% $H_2O$ by mass. Curve 430 represents oxygen sensor response to exhaust gases containing 1.2% $H_2O$ by mass. V1 represents a lower or first reference voltage and V2 represents a higher or second reference voltage.

Thus, it may be observed that curve 410 exhibits the lowest pumping current when a reference voltage of less than V1 is applied to the oxygen sensor's Nernst cell. Curve 430 exhibits the highest pumping current when a reference voltage of less than V1 is applied to the oxygen sensor's Nernst cell. However, when the reference voltage is increased to greater than V2, curve 430 indicates the lowest pumping current and curve 410 indicates the highest pumping current. Vertical marker 450 represents the change in pumping current for 10% $H_2O$ in exhaust gas and vertical marker 460 represents the change in pumping current for 1.2% $H_2O$ in exhaust gas. Consequently, the change in pumping current is indicative of a concentration of $H_2O$ in exhaust gases sensed via the oxygen sensor.

Thus, the change in pumping current of an oxygen sensor exposed to different Nernst cell voltages may be indicative of $H_2O$ in exhaust gas. The water in exhaust gas may be indicative of soot stored in a particulate filter because the amount of water storable in a particulate filter increases as an amount of soot stored in the particulate filter increases, at least up to some soot storage limit. In a different case, it is possible that depending on the type of fuel supplied to the engine and engine oil consumption, soot particles may be hydrophobic (e.g., water repelling) instead of hydrophilic (water attracting). Soot particle type and the amount of soot determine the amount of water that gets stored on the particulate filter. Therefore, the present invention also includes using any change (e.g., increase or decrease) in the amount of water stored within the particulate filter to determine the soot amount stored within the particulate filter.

Referring now to FIG. 5, an example sequence of the system of FIG. 1 operating according to the method of FIGS. 2 and 3 is shown. Vertical markers T0-T3 represent times of particular interest in the sequence. The sequence of FIG. 5 represents a cold engine start (e.g., the engine is started when the engine is not at its stabilized warm operating temperature).

The first plot from the top of FIG. 5 is a plot of water flow into a particulate filter as determined via an oxygen sensor and mass airflow rate through the engine versus time. The vertical axis represents water flow into the particulate filter and the water flow rate increases in the direction of the Y axis arrow. The horizontal axis represents time and time increases from the right side of the plot to the left side of the plot.

The second plot from the top of FIG. 5 is a plot of water flow out of the particulate filter as determined via an oxygen sensor and mass airflow rate through the engine versus time. The vertical axis represents water flow out of the particulate filter and the water flow rate increases in the direction of the Y axis arrow. The horizontal axis represents time and time increases from the right side of the plot to the left side of the plot.

The third plot from the top of FIG. 5 is a plot of integrated water flow into a particulate filter minus water flow out of the particulate filter as determined via oxygen sensors versus time. The vertical axis represents water stored in the particulate filter and the stored water amount increases in the direction of the Y axis arrow. The horizontal axis represents time and time increases from the right side of the plot to the left side of the plot. Horizontal line 502 represents a threshold amount of water stored in the particulate filter. The threshold amount is correlated to a threshold amount of soot trapped in the particulate filter. Particulate filter regeneration may be initiated in response to the integrated water stored in the particulate filter exceeding threshold 502.

The fourth plot from the top of FIG. 5 is a plot of engine spark advance versus time. The vertical axis represents engine spark advance and engine spark advance increases in the direction of the Y axis arrow. The horizontal axis represents time and time increases from the right side of the plot to the left side of the plot. Horizontal line 504 represents top-dead-center compression stroke spark timing for engine cylinders. Spark timing less than top-dead-center represents spark timing in the expansion stroke. Spark timing greater than top-dead-center represents advanced spark timing during the compression stroke.

The fifth plot from the top of FIG. 5 is a plot of a particulate filter regeneration flag (e.g., a bit stored in memory to indicate start (value of 1) or do not start (value of zero) particulate filter regeneration) versus time. A higher value of the trace in the direction of the vertical axis arrow indicates begin regenerating the particulate filter when conditions are conducive for regeneration. A lower value of the trace indicates do not begin regeneration the particulate filter. The horizontal axis represents time and time increases from the right side of the plot to the left side of the plot.

The sixth plot from the top of FIG. 5 is a plot of engine speed versus time. The vertical axis represents engine speed and engine speed increases in the direction of the vertical axis arrow. The horizontal axis represents time and time increases from the right side of the plot to the left side of the plot.

At time T0, the engine is started and upstream and downstream oxygen sensors are monitored to determine water flow into a particulate filter. A reference voltage of the upstream oxygen sensor and a reference voltage of the downstream oxygen are switched between a lower voltage where water is not disassociated from engine exhaust gases and a higher voltage where water is disassociated from engine exhaust gases (not shown). Water concentrations passing the upstream and downstream oxygen sensors are multiplied by the exhaust flow rate or engine airflow rate to determine water flow entering and exiting the particulate filter as is described in FIGS. 2 and 3. The difference between the water flowing into the particulate filter as determined via the upstream oxygen sensor and the water flowing out of the particulate filter as determined via the downstream oxygen sensor begins to be integrated. The particulate filter (PF) flag, or bit in memory indicating whether or not to begin particulate filter regeneration is not asserted and the engine is accelerated from zero speed to idle speed.

Between time T0 and time T1, the flow rate of water into the particulate filter increases and the flow rate of water out of the particulate filter remains low indicating the particulate filter is storing water. The integrated water stored in the particulate filter increases and spark advance moves from retarded to advanced. The particulate filter regeneration flag remains not asserted and engine speed increases near time T1.

At time T1, the integrated amount of water stored in the particulate filter exceeds threshold 502. Consequently, the particulate filter regeneration flag is asserted. Spark timing continues advanced and water continues to flow into the particulate filter. Engine speed continues to increase at a slow rate.

At time T2, temperature within the particulate filter exceed a dewpoint temperature and water stored in the particulate filter begins to be released. The water flow out of the particulate filter increases and the engine continues to operate. The particulate filter regeneration has not commenced. The amount of stored water in the particulate filter decreases as water flows out of the particulate filter.

At time T3, particulate filter regeneration commences. The particulate filter may be regenerated after the engine reaches a threshold temperature and/or other engine operating conditions are met. Spark timing is retarded to increase particulate filter temperature and promote soot oxidation. Further, the engine may be operated with a lean air-fuel ratio. The amount of water stored in the particulate filter is adjusted to zero.

In this way, water stored in a particulate filter during cold engine starting may be a basis for regenerating a particulate filter. By applying oxygen sensors to determine particulate filter loading, it may be possible to utilize existing exhaust system sensors without having to increase system cost.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an engine;
an exhaust system coupled to the engine, the exhaust system including a particulate filter, a first oxygen sensor, and a second oxygen sensor;
a controller including instructions stored in a non-transitory memory, which when executed by the controller, cause the controller to estimate an amount of water stored in the particulate filter responsive to outputs of the first and second oxygen sensors; and
applying a first voltage to the first oxygen sensor and a second voltage to the second oxygen sensor via the controller, the first voltage less than a voltage at which water is dissociated at the first oxygen sensor, the second voltage greater than the voltage at which water is dissociated at the first oxygen sensor.

2. The vehicle system of claim 1, where the first oxygen sensor is upstream of the particulate filter in a direction of exhaust flow, and where the second oxygen sensor is downstream of the particulate filter.

3. The vehicle system of claim 1, where the controller includes further instructions to adjust a Nernst cell voltage of the first and second oxygen sensors.

4. The vehicle system of claim 3, where the amount of water stored in the particulate filter is based on a difference in pumping current of the first oxygen sensor and a difference in pumping current of the second oxygen sensor.

5. The vehicle system of claim 1, where the controller includes further instructions to estimate the amount of water stored in the particulate filter based on an amount of water entering the particulate filter before a temperature of the particulate filter is greater than a dewpoint temperature in the particulate filter.

6. The vehicle system of claim 1, where the controller includes additional instructions to regenerate the particulate filter in response to the amount of water stored in the particulate filter being greater than a threshold amount.

7. The vehicle system of claim 6, where the threshold amount corresponds to a threshold amount of soot stored within the particulate filter.

8. The vehicle system of claim 7, further comprising additional instructions to regenerate the particulate filter including instructions to retard spark timing to increase exhaust gas temperature.

9. A method for regenerating a particulate filter, comprising:
  estimating an amount of water stored within the particulate filter;
  estimating an amount of soot stored within the particulate filter from empirically determined soot amounts indexed via the amount of water stored within the particulate filter; and
  regenerating the particulate filter in response to the amount of soot stored within the particulate filter.

10. The method of claim 1, where the estimated amount of water stored within the particulate filter is based on an amount of water stored within the particulate filter after a cold engine start and before a dewpoint temperature in the particulate filter is exceeded.

11. The method of claim 1, where estimating the amount of water stored within the particulate filter is based on output of two oxygen sensors, and further comprising:
  regenerating the particulate filter when an integrated value of water flow into the particulate filter minus water flowing out of the particulate filter is greater than a threshold, the threshold correlated to the amount of soot stored in the particulate filter.

12. The method of claim 11, where a first of the two oxygen sensors is located upstream of the particulate filter and where a second of the two oxygen sensors is located downstream of the particulate filter, and further comprising:
  applying a first voltage to the first of the two oxygen sensors and a second voltage to the second of the two oxygen sensors, the first voltage less than a voltage at which water is dissociated at the first of the two oxygen sensors, the second voltage greater than the voltage at which water is dissociated at the first of the two oxygen sensors.

13. The method of claim 1, where the particulate filter is regenerated via increasing a temperature of the particulate filter over a threshold temperature and supplying lean engine exhaust gas to the particulate filter.

14. The method of claim 13, where regenerating the particulate filter includes oxidizing soot stored within the particulate filter.

15. A method for regenerating a particulate filter, comprising:
  applying a first voltage to a first of two oxygen sensors and a second voltage to a second of the two oxygen sensors, the first voltage less than a voltage at which water is dissociated at the first of the two oxygen sensors, the second voltage greater than the voltage at which water is dissociated at the first of the two oxygen sensors; and
  regenerating the particulate filter in response to a value of integration of a difference in an amount of water entering the particulate filter and an amount of water exiting the particulate filter exceeding a threshold value, the amount of water entering the particulate filter and the amount of water exiting the particulate filter based on output of the two oxygen sensors.

16. The method of claim 15, where the amount of water entering the particulate filter is based on water entering the particulate filter after an engine start and before a dewpoint temperature is reached in the particulate filter.

17. The method of claim 15, where the particulate filter is regenerated via increasing a temperature of the particulate filter, and where the regeneration of the particulate filter is based on the value of integration of the difference exceeding the threshold, the threshold correlated to an amount of soot stored in the particulate filter.

18. The method of claim 15, where the amount of water entering the particulate filter is based on output of an oxygen sensor upstream of the particulate filter.

* * * * *

UNITED STATES PATENT AND TRADEMARK OFFICE
CERTIFICATE OF CORRECTION

PATENT NO. : 9,523,303 B2  
APPLICATION NO. : 14/608829  
DATED : December 20, 2016  
INVENTOR(S) : Gopichandra Surnilla et al.

It is certified that error appears in the above-identified patent and that said Letters Patent is hereby corrected as shown below:

In the Claims

Column 13, Line 11, Claim 10, replace "1" with "9".

Column 13, Line 16, Claim 11, replace "1" with "9".

Column 13, Line 35, Claim 13, replace "1" with "9".

Signed and Sealed this
Fourth Day of April, 2017

Michelle K. Lee
*Director of the United States Patent and Trademark Office*